July 15, 1924.
D. E. GULICK
FLUSHING DEVICE
Filed April 26, 1918  2 Sheets-Sheet 1
1,501,331
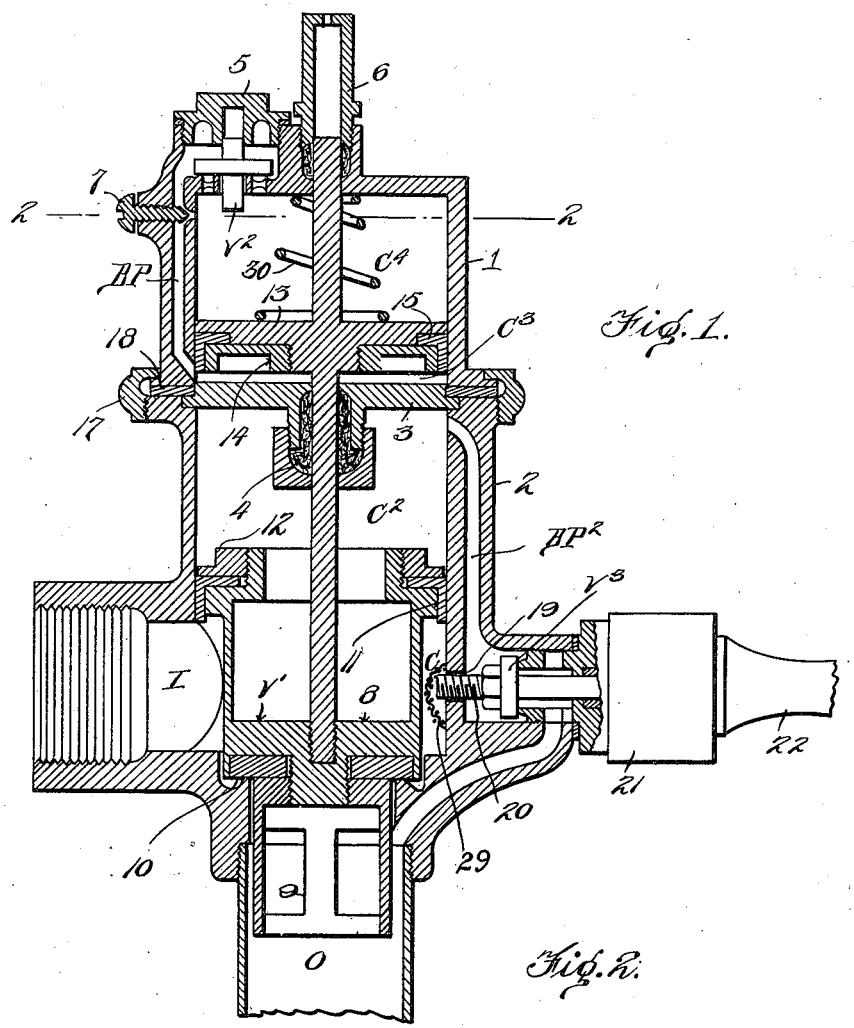
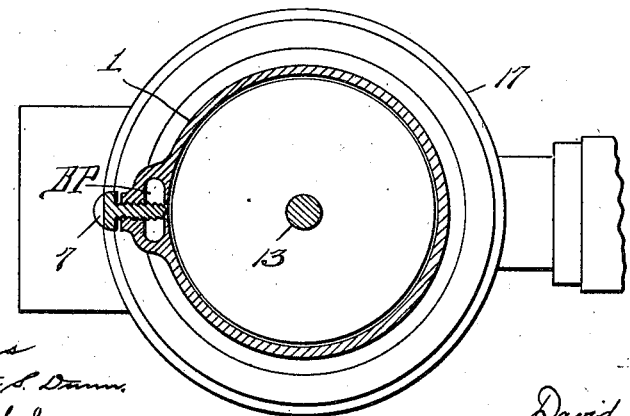

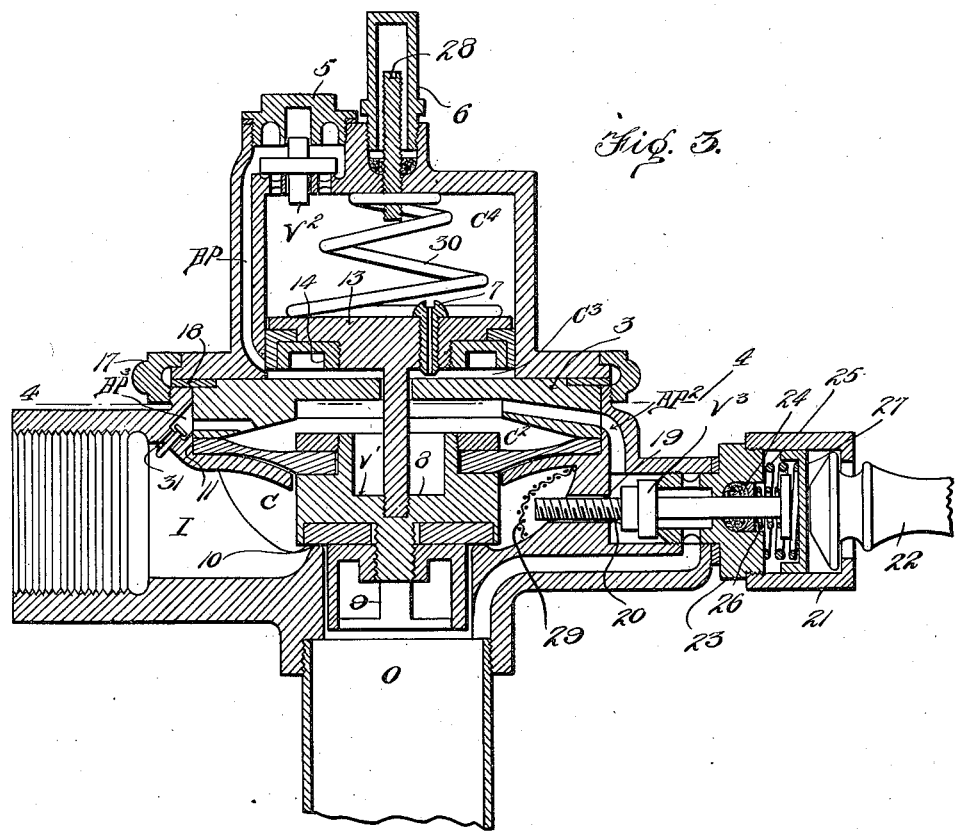

Patented July 15, 1924.

1,501,331

UNITED STATES PATENT OFFICE.

DAVID E. GULICK, OF SAN FRANCISCO, CALIFORNIA.

FLUSHING DEVICE.

Application filed April 26, 1918. Serial No. 231,011.

*To all whom it may concern:*

Be it known that I, DAVID E. GULICK, a citizen of the United States of America, residing at 845 Sutter Street, San Francisco, in the county of San Francisco and State of California, have invented new and useful Improvements in Flushing Devices, of which the following is a specification.

This invention relates to flushing devices, and its object is to produce a device which shall be slow closing and positive in operation.

In carrying out the invention, I construct a chamber, the upper portion of which is separated from the lower by means of a partition. In the upper chamber there is placed a piston and in the lower chamber there is also placed either a piston or flexible diaphragm to which is attached a main valve,—the pistons in the upper and lower chambers being also connected together so as to move simultaneously.

The upper chamber has a by-pass leading from the upper to the lower part, said by-pass being controlled by a one-way check.

There is also provided a small opening or adjustable leak passage or passages to permit contents of the upper chamber to pass from one side to the other of the piston therein.

The main valve in the lower chamber controls the flow through the discharge outlet.

There is also a by-pass leading from the upper part of the lower chamber to the discharge outlet, said by-pass being controlled by a valve, hereinafter referred to as a relief or initiating valve.

The relief valve is opened by hand or otherwise but all the other operations are automatic.

In the accompanying two sheets of drawings I have illustrated my invention.

Figure 1 is a longitudinal section showing one form of the apparatus.

Figure 2 is a cross section taken at the line 2, 2 of Figure 1.

Figure 3 is a longitudinal section showing a modified form in which a flexible diaphragm is used instead of a piston in the lower chamber.

Figure 4 is a cross section taken at the line 4, 4 of Figure 3.

In the drawings 1 and 2 form the chamber and they may be connected together by means of a union ring 17 or other suitable method. 3 is the partition which separates the upper part from the lower part of the chamber. Valve 8, washer 10, cup leather 11 and nut 12, together form the main valve $V^1$ and piston in the lower chamber. Disc 13, nut 14 and cup leather 15 together form the piston in the upper chamber, the extension on the underside of the said piston being connected to the aforementioned main valve. 9 is a guide for main valve $V^1$. The nut 4 is a cap for stuffing box on partition 3 where the stem passes through, joining the two aforementioned pistons. 5 is a cap to give access to check valve $V^2$. 6 forms a stuffing box and shield at point shown. 7 is a screw to regulate the length of flush. The length of flush may be lengthened or shortened by screwing 7 in or out, thereby closing or opening the hole as indicated at screw 7 in Figure 1 or by using different screws having a different sized opening through them as indicated by 7 in Figure 3 or by use of an adjustable screw to regulate the travel of pistons and main valve as indicated by 28 in Figure 3. 18 is a gasket between parts 1 and 2. 19 is an opening or by-pass connecting by-pass $BP^2$ with lower chamber C. The stem 20 extends into or through opening 19. BP is a by-pass connecting the upper end of upper chamber with the lower end of said chamber. This by-pass is controlled by a one-way check $V^2$. $BP^2$ is a by-pass connecting the upper end of lower chamber with the discharge outlet. The by-pass $BP^2$ is controlled by a relief valve $V^3$.

In Figure 3, by-pass $BP^3$ is a by-pass similar to $BP^2$ and connects the inlet with closing chamber $C^2$. In by-pass $BP^3$ is placed a pin or stem 31 to partly close the opening of the by-pass and to also make it less liable to become clogged. This pin 31 may be of any suitable shape or detail and may be secured in place so as to leave an opening around it to permit water to pass through the by-pass or it may be simply placed loosely in the by-pass so that it will be moved by the water passing through the valve and the said by-pass. The said by-pass $BP^3$ may be placed in any convenient location where it will connect the inlet I or chamber C with closing chamber $C^2$.

Part 21 is a holder for handle 22. 23 is a seat for relief valve $V^3$. The stuffing box 24 prevents leakage at point indicated. Relief valve is closed by the spiral spring 26. The handle is normally held in the position shown by the plate or circular disc 27 and coil spring 25. As a safeguard against the opening 19 becoming clogged a screen 29 is so placed that the water must pass through it before reaching the opening. 30 is a spring placed to exert a pressure on one of the pistons to overcome friction in the movement of the pistons and to assist in the closing of main valve. I is the inlet and O is the discharge outlet.

For convenience in subsequent reference I have indicated the sub-divisions of the upper and lower chambers by C, $C^2$, $C^3$ and $C^4$.

The operation of the device as described is as follows:—

The device is set up with the inlet I connected to the water supply. The chambers $C^3$ and $C^4$ are filled. All the parts rest in their normal position as shown in the drawing. It is then ready for operation.

To operate,—the relief or initiating valve is opened, thus relieving the pressure in chamber $C^2$. This allows the pressure in chamber C to lift piston and main valve $V^1$ thus opening the discharge outlet O, forcing the water in chamber $C^2$ out through $BP^2$ into discharge outlet and at the same time lifting piston 13 and forcing contents in chamber $C^4$ through check valve $V^2$ and by-pass BP into chamber $C^3$.

The main valve will thus remain open and the water continue to flow through the discharge outlet O until the relief valve $V^3$ is closed.

When the relief valve is closed, the closing operation of the main valve begins.

Water passes through opening 19 and up through by-pass $BP^2$ and also through $BP^3$ into chamber $C^2$ thus restoring the pressure in that chamber to normal and forcing the piston and main valve $V^1$ down toward its seat. In the closing operation of the main valve, water may pass through by-pass $BP^2$ or $BP^3$ or through both into closing chamber $C^2$. This practically insures that there will always be an opening between the inlet I or chamber C and the closing chamber $C^2$ and, therefore, makes the device more positive in its action. To cause the main valve to close slowly, it is attached to the piston 13, which separates chambers $C^3$ and $C^4$. This piston 13 acts as a check as it can only move downward as fast as the contents of chamber $C^3$ are forced by or through the regulating screw 7 into chamber $C^4$.

The length of flush may be changed by means of the regulating screw 7 or it may be changed by means of an adjustable screw 28 to control the travel of the main valve and pistons.

In order to insure against the water-way or by-pass 19 becoming clogged, the stem 20 which is attached to relief valve $V^3$ and moves therewith is placed through the opening 19. As a further protection against this opening becoming clogged a screen 29 may be placed so as to protect it from dirt and foreign matter in the water.

In order to overcome the friction of the movable pistons and to insure the closing of main valve $V^1$ under low pressures or in the absence of a pressure in the chambers C and $C^2$, a spring 30 may be placed to exert a downward pressure on the pistons and main valve, causing them to move downward and close main valve.

In Figure 3, I have shown a modified form of the device, using a flexible diaphragm in lieu of a movable piston but the operation of the device as shown in Figure 3 and Figure 1 is identical and as flexible diaphragms and pistons, otherwise known as sliding diaphragms, are well known substitutes for each other, they need not be further described.

While I have referred to upper and lower chambers and parts, it is to be understood that this refers only to the position of the device as shown in the drawings as it may be placed in any convenient position for practical use.

It will be seen that the small controlling by-pass at regulating screw 7 is entirely shut off and protected from any dirt or foreign matter which might clog it and which might be contained in the water passing through the device when in operation.

It will also be noted that the contents in chambers $C^3$ and $C^4$ are alternately forced one way and then the other through controlling by-pass at 7 at each opening and closing of the main valve. This insures that the controlling by-pass at the regulating screw 7 cannot become clogged and makes the valve positive in its closing.

Any loss from leakage out of chambers $C^3$ and $C^4$ will be supplied by leakage into them from chamber $C^2$.

Having thus described by invention, and an embodiment of it in full, clear and exact terms as required by law, and knowing that it comprises novel, useful and valuable improvements in the art to which it pertains, I here state that I do not wish to be limited to the precise construction and arrangement of the several parts, as herein set forth as they may be variously modified by a skilled mechanic without departing from the spirit of the invention.

What I claim and desire to secure by Letters Patent of the United States of America, is the following:

I claim:

1. The combination in a flushing valve of a casing divided by a fixed partition into two noncommunicating main chambers, one of said chambers having an inlet and a main discharge outlet axially disposed as to the said two chambers, a main valve to control said discharge outlet, a movable division in each of the main chambers, the said main valve and two movable divisions connected to move in unison, an initiating valve and means through the opening of said initiating valve of applying hydraulic pressure to the under area of one of said movable divisions in excess of the largest seating area of the aforementioned main valve to open said valve.

2. The combination in a flushing valve of a casing divided into upper and lower main chambers, the lower of said chambers having an inlet and main discharge outlet, a movable division in each of said main chambers, a main valve to close said discharge outlet, the said main valve and two movable divisions connected to move in unison, passage means to permit the passage of liquid alternately from one side to the other of the movable division in the upper main chamber, a bypass to regulate the closing of the main valve, a choking means to give a refill, an initiating valve and means through the opening of said initiating valve of applying hydraulic pressure to the under area of the lower movable division and main valve in excess of the largest seating area to open said main valve.

3. In a flushing valve the combination of a casing divided into upper and lower main chambers, the lower main chamber having an inlet and a main discharge outlet axially disposed as to the two main chambers, a movable division dividing the lower main chamber into two sub-chambers, a movable piston dividing the upper main chamber into two sub-chambers, passage means to permit the quick flow of liquid from one side to the other of said piston, means to regulate the return flow of said liquid, a main valve to control the main discharge outlet, the said movable division, movable piston and main valve connected to move in unison with the movable piston acting as a check in the closing movement of the main valve, a choking refill means, an initiating valve not having mechanical contact with the main valve, piston or aforementioned movable division and means by the opening of the initiating valve of applying hydraulic pressure to the area of the exposed underside of the said movable division and main valve in excess of the extreme diameter of contact of the said valve to its seat for the opening of said main valve.

4. A flushing valve comprising the combination of a casing divided into two main chambers, a piston in one of said chambers, passage means to permit flow of liquid from one side to the other of said piston, a movable division in the other main chamber, passage means to permit the flow of liquid from the lower to upper side of said movable division, an inlet opening below the plane of the movable division, a main discharge outlet axially disposed as to the movement of the said movable division, a main valve to control the main discharge outlet, said main valve, movable division and piston connected to move in unison, regulating means to retard the closing movement of the main valve, a choking refill means to give an afterfill, an initiating valve not having mechanical contact with the aforementioned main valve, movable division or piston and means for opening the main valve by applying hydraulic pressure to the exposed under area of the said movable division and main valve in excess of the extreme diameter of the contact of the main valve on its seat.

5. A flushing device comprising in combination a casing divided by a fixed partition into two main chambers, a main discharge outlet axially disposed as to the two main chambers, a main valve to control said discharge outlet, movable means in one of said main chambers dividing it into two sub-chambers, passage means connecting said sub-chambers, movable means dividing the other main chamber into two sub-chambers, passage means connecting said sub-chambers, passage means connecting the last mentioned main chamber with the discharge outlet and a valve to control said passage.

6. A flushing device comprising two main chambers, the upper main chamber being divided into two sub-chambers by a movable piston, normally open passage means connecting the sub-chambers on the opposite sides of the piston, means to permit the quick flow of liquid from one side to the other of the piston and means to regulate the return flow of the liquid, means to prevent an increase of pressure above normal in said main chamber during the alternating movemnt of the piston therein, the other main chamber having a main inlet and a main discharge outlet, a valve to control the discharge outlet, a movable division dividing the said main chamber into two sub-chambers, a normally open water passage connecting these sub-chambers, a bypass connecting the said water passage with the outlet, an inwardly opening valve to control the bypass and an externally threaded stem attached to said valve and movable therewith and within the forementioned water passage to prevent the clogging thereof.

DAVID E. GULICK.

Witnesses:—
  Fremont S. Dunn,
  Ralph E. Nicholas.